340-870.11 SR
XR 3,142,051 SS REFERENCE SEARCH ROOM

AUTOMATIC START FOR NORMALLY INACTIVE CODE COMMUNICATION SYSTEM

Filed July 19, 1962 3 Sheets-Sheet 1

INVENTOR.
W. R. SMITH
BY
Forest B. Hitchcock
HIS ATTORNEY

AUTOMATIC START FOR NORMALLY INACTIVE CODE COMMUNICATION SYSTEM

Filed July 19, 1962 3 Sheets-Sheet 2

INVENTOR.
W. R. SMITH
BY
Forest B. Hitchcock
HIS ATTORNEY

July 21, 1964 W. R. SMITH 3,142,051

AUTOMATIC START FOR NORMALLY INACTIVE CODE COMMUNICATION SYSTEM

Filed July 19, 1962 3 Sheets-Sheet 3

INVENTOR.
W. R. SMITH

BY
Forest B. Hitchcock
HIS ATTORNEY

United States Patent Office 3,142,051
Patented July 21, 1964

3,142,051
AUTOMATIC START FOR NORMALLY INACTIVE CODE COMMUNICATION SYSTEM

Willis R. Smith, Rochester, N.Y., assignor to General Signal Corporation
Filed July 19, 1962, Ser. No. 210,963
12 Claims. (Cl. 340—213)

Figure 3:
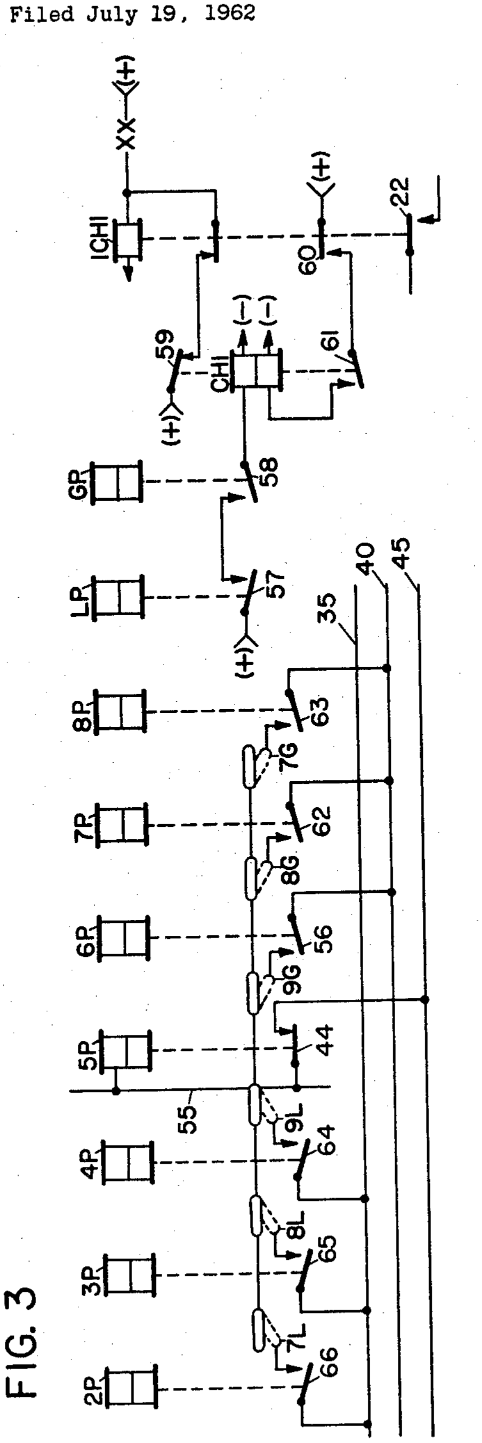

This invention relates to normally inactive code communication systems, and it more particularly pertains to the automatic starting of a code communication system for the transmission of indications during an indication cycle of operation.

Normally inactive code communication systems are used for the communication by codes over a communication channel of indications of conditions of devices from one or more field stations to a remote office. Such systems are rendered active to transmit during an indication cycle in response to a change in the condition of a device to have its position indicated. When the system is used, however, to communicate an indication as to a pressure reading, for example, it may not be necessary to transmit a new indication for a minor digital change in a pressure reading, but only when there is an increase or a decrease of a predetermined number of digits.

The present invention provides a system for rendering a normally inactive code communication system active in response to a change of a predetermined number of digits in pressure from the last digit having its indication transmitted over the code communication system to the office. This is true irrespective of what digit was last transmitted, the difference always being the same predetermined value.

To provide this mode of operation, digital input means is provided for selectively energizing a plurality of channel circuits, one circuit at a time, in accordance with a continuous digital reading of pressure. The pressure, at the time of indication transmission, is registered and stored at the transmitting station until the transmission of an indication of another pressure reading. The successive energization of digital channels relative to the channel for the digit registered is detected to determine whether the pressure is increasing or decreasing and to what extent. When the extent of increase or decrease reaches a predetermined value, the communication system is rendered active for transmitting during an indication cycle an indication of the reading at that time.

An object of the present invention is to render a code communication system active for the transmission of indications when a digital reading increases or decreases a predetermined number of digits above or below any digital reading that may have been registered.

Other objects, purposes and characteristic features of the present invention will be in part obvious from the accompanying drawings and in part pointed out as the description of the invention progresses.

In describing the invention in detail, reference is made to the accompanying drawings in which similar reference characters are used for corresponding apparatus throughout the several illustrations; and in which—

Figure 1:
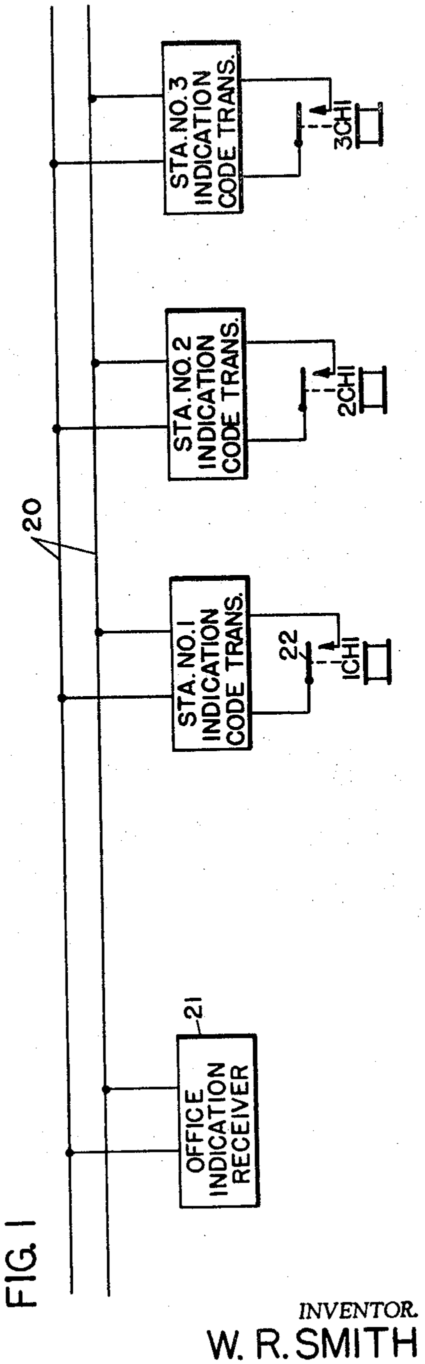
Figure 2A:
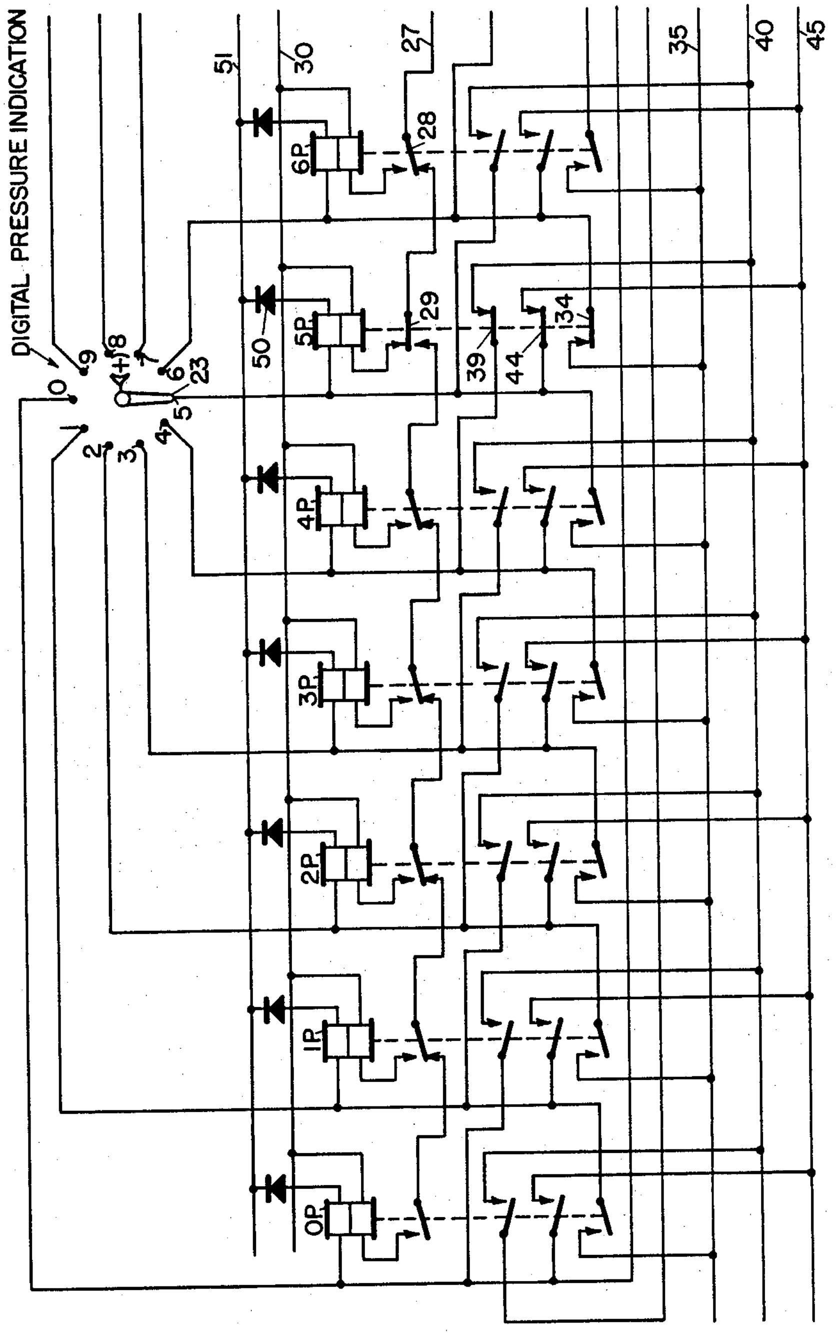
Figure 2B:
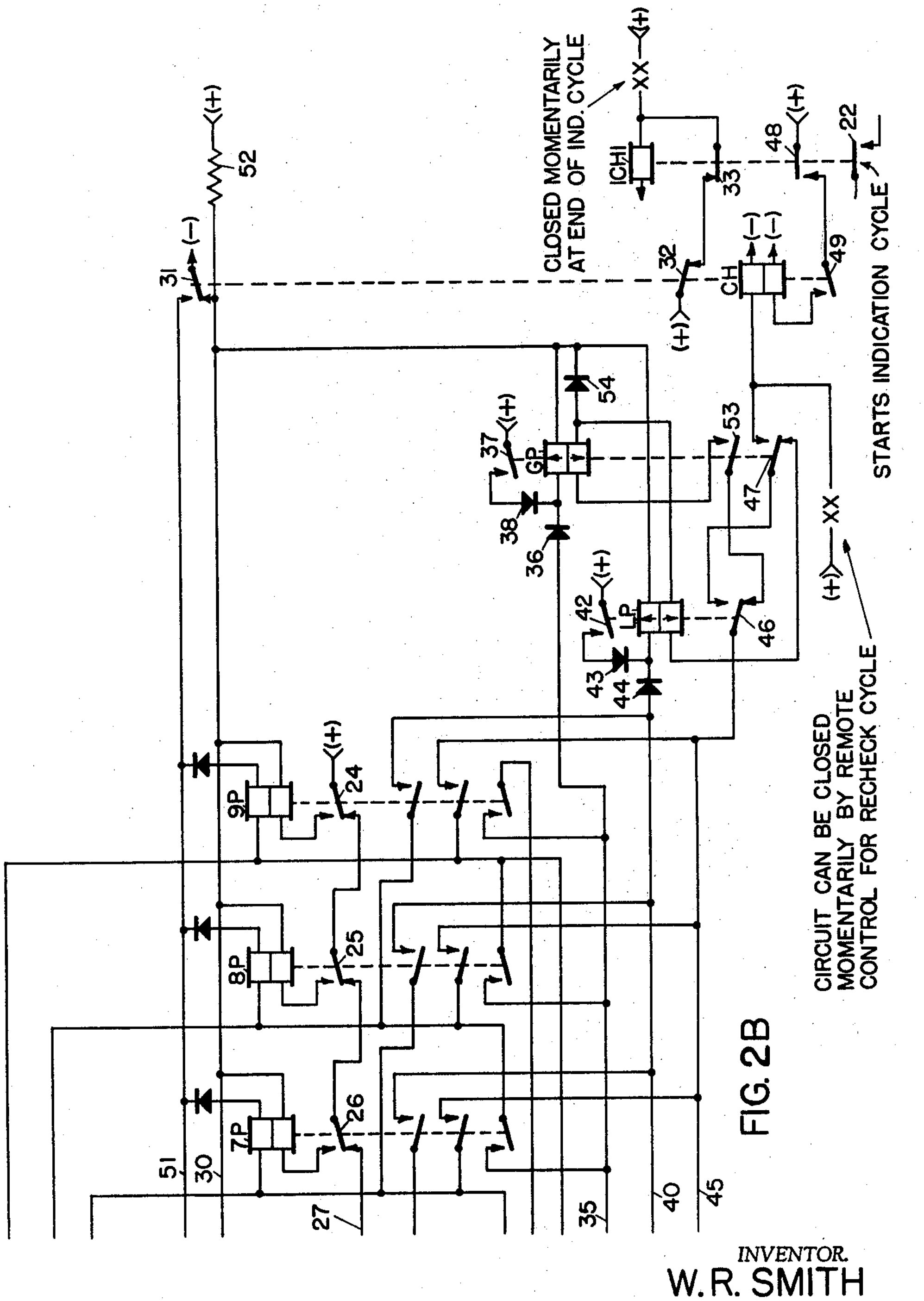

FIG. 1 illustrates a code communication system for the communiaation of indications from a plurality of field stations to an office;

FIGS. 2A and 2B, when placed end-to-end illustrate circuit means for rendering the code communication apparatus of FIG. 1 active for the transmission of indications from a typical field station; and FIG. 3 illustrates a modified form of the present invention for selecting the difference in pressure that may be required for rendering the code communication system active.

For the purpose of simplifying the illustrations and facilitating the explanation thereof, the various parts and circuits constituting typical embodiments of the present invention have been shown diagrammatically in an arrangement to more particularly facilitate an understanding of the mode of operation of the system and the principles involved, rather than to attempt to point out all of the necessary details of construction and the specific arrangement of components that may be provided by those skilled in the art in accordance with the requirements of practice. The symbols (+) and (−) have been used to indicate connections to the positive and negative terminals respectively of suitable batteries or other sources of direct current.

The present invention is particularly applicable to controlling the rendering active of a normally inactive code communication system for the communication of indication codes from a plurality of field stations to a central office. Such a system is illustrated in FIG. 1, wherein a plurality of field stations have their indication code transmitters connected in multiple to a suitable communication channel 20. An Office Indication Receiver 21 is also connected to the communication channel for receiving indication codes transmitted from the respective field stations.

One such system to which the present invention may be applied is a system in which stepping apparatus is provided at each of the stations and at the office which is normally inactive, but which when rendered active operates through a cycle of operation for counting successive steps during which respective code elements are transmitted to the control office corresponding, for example, to the elements of a binary code selected by meter reading apparatus. The code communication system employed may be of a type, for example, wherein mark and space code characters are selectively transmitted during an indication cycle over the communication channel, such characters being formed by selectively shunting and unshunting the communication channel 20 during the several steps constituting an indication cycle.

The rendering active of the code communication system for transmission during an indication cycle is accomplished, for example, by the dropping away of a normally energized change relay CH1 which is provided at each of the field stations. Thus the relay 1CH1 is provided for the initiation of an indication cycle at field station No. 1, and the closure of back contact 22 of this relay initiates the code communication system into a cycle of operation for the transmission of indication codes indicative of the meter reading, for example, that exists at field station No. 1 at the time the cycle is transmitted. At the end of the cycle of operation, the relay 1CH1 is restored to its normally energized position so that it is in condition for subsequently initiating another indication cycle of operation.

With reference to FIGS. 2A and 2B, apparatus is provided for initiating the code communication system into a cycle of operation for the transmission of indications when there is a change of ten pounds pressure from the pressure reading previously transmitted. Thus the apparatus of FIGS. 2A and 2B includes suitable digital pressure indication apparatus which is diagrammatically illustrated as having a rotating brush 23 which is rotated in accordance with a change in pressure to selectively apply energy to respective digital input wires 0–9 which may be considered as being indicative of digital pressure inputs applied from suitable meter reading apparatus. This input may be applied in practice to these wires by suitable decoding or conversion circuits. For example, the output of the meter reading apparatus may be in the form of a binary code, and a binary to digital code converter network may be employed to provide for the selective energization of the wires 0–9 rather than employing the simplified system illustrated in FIG. 2A.

A bank of pressure registration relays P is provided for registering the digital pressure at a time when a reading is transmitted to the office. To provide such registration, a relay P is provided for each of the pressure input wires 0–9, and one of these relays, when picked up, is maintained energized until initiation of another cycle of operation of the code communication apparatus. Thus it will be readily apparent that the energization of a relay P under these conditions establishes a reference point from which it can be determined when there has been a change of pressure of a predetermined number of pounds such as to call for the transmission to the office of an indication code indicative of a new pressure reading.

Relays LP and GP are provided for energization in accordance with a change in the pressure input means to a lesser or greater pressure respectively.

A relay CH is provided for registering when an indication cycle should be initiated.

With reference to FIG. 3, a modified system is illustrated showing how the circuits for the pressure registration relays P can be modified to provide initiation when the pressure difference is some predetermined value less than a difference of ten pounds pressure.

Having thus described the general organization of the system, more specific description of the circuit organization will be set forth upon consideration of typical operating conditions.

*Operation*

The apparatus of FIGS. 2A and 2B is illustrated as being in a condition where the pressure reading is five pounds, and it is assumed that this is the pressure reading that has last been transmitted, via the communication system, to the control office.

In accordance with this condition, the relay 5P for registering the five pound pressure reading is in its picked up position because it has been picked up at the time of the transmission of the indication of this reading to the control office. This relay is maintained energized by a stick circuit including back contact 24 of relay 9P, back contact 25 of relay 8P, back contact 26 of relay 7P, wire 27, back contact 28 of relay 6P, front contact 29 of relay 5P, lower winding of relay 5P, stick bus 30 and back contact 31 of relay CH. The relay 5P will thus be maintained energized until the next indication cycle is transmitted.

The relay 1CH1 (see FIG. 2B) which is used to initiate an indication cycle is also normally maintained energized by the energization of its stick circuit including back contact 32 of relay CH and front contact 33 of relay 1CH1.

To consider further operation of this system, it will be assumed that there is an increase in pressure so that the digital pressure indicator of FIG. 2A is actuated to its number six position. With the indicator in its number six position energy is applied to the pick up bus for the greater pressure relay GP (see FIG. 2B). The circuit by which the relay GP is picked up at this time includes brush 23 of the digital pressure indication device of FIG. 2A, front contact 34 of relay 5P, pick up bus 35 for the greater pressure relay GP, rectifier 36, upper winding of relay GP and back contact 31 of relay CH. The picking up of this relay closes a stick circuit to maintain the relay GP picked up until the next cycle of operation including front contact 37 of relay GP, rectifier 38, upper winding of relay GP and back contact 31 of relay CH.

Further movement of brush 23 as the pressure increases is ineffective to cause the operation of any relays until the pressure increases to a point where the brush 23 reaches the position number four. At this time a circuit is closed to cause the picking up of the low pressure relay LP. This circuit includes brush 23 in the number four position, front contact 39 of relay 5P, bus 40, rectifier 41, upper winding of relay LP and back contact 31 of relay CH. Relay LP, when picked up, is maintained energizsed by a stick circuit including front contact 42 of relay LP, rectifier 43, upper winding of relay LP and back contact 31 of relay CH. It will thus be readily apparent from the description as has been set forth that the second of the two relays GP and LP is picked up when the change of pressure reaches an amount corresponding to nine pounds difference.

If the pressure continues to increase to a ten pound difference, a circuit is closed to pick up the relay CH and thus to initiate a cycle of operation of the code communication system. Thus if it is assumed that the brush 23 advances so as to make a complete counter-clockwise revolution and reach the number five position, a circuit is closed for the energization of relay CH including brush 23, front contact 44 of relay 5P, bus 45, front contact 46 of relay LP, front contact 47 of relay GP and upper winding of relay CH. The picking up of relay CH causes the dropping away of relay 1CH1 by opening its stick circuit at back contact 32 for initiating an indication cycle. Relay CH is maintained picked up during the indication cycle by a stick circuit including back contact 48 of relay 1CH1, front contact 49 of relay CH and lower winding of relay CH.

The picking up of relay CH in accordance with the initiation of an indication cycle, opens back contact 31 in the stick circuits for the relays LP and GP and the pressure registration relay 5P to permit these relays to be dropped away. If, however, the pressure remains during the cycle at five pounds so that the brush 23 is maintained in position number five, the relay 5P is held up by its pick up circuit including brush 23 in the number five position, upper winding of relay 5P, rectifier 50, pick up bus 51 and front contact 31 of relay CH. The lower winding of relay 5P is shunted at this time through the resistor 52 so that the relay is made slow to drop away to cover the crossover time of contact 31 when the relay CH is dropped away to close a stick circuit for relay 5P which has been heretofore described. If the pressure is changed during the cycle so that the brush 23 is in a position other than the number five position, a corresponding pressure registration relay P is picked up in the same manner that has been described for the picking up of relay 5P to provide storage and registration for the pressure that last had its indication transmitted to the control office.

It is provided that if the pressure increases from the last reading transmitted so as to pick up the relay GP and then is reduced to the initial registered pressure, the relay GP is again restored to its dropped away position. The circuit by which relay GP is restored under these conditions can be considered, for example, if it is assumed that relay GP has been picked up upon an increase in pressure from five to six pounds as has been described. It will further be assumed that the pressure is then reduced to five pounds so that the brush 23 makes connection in the number five position. Energy is applied under these conditions to the lower winding of relay GP with a knock down polarity in a circuit including brush 23 in number five position, front contact 44 of relay 5P, bus 45, back contact 46 of relay LP, front contact 53 of relay GP, lower winding of relay GP, rectifier 54 and back contact 31 of relay CH. The energization of the lower winding of relay GP is by a polarity which will oppose the energization of the upper winding, and thus the relay GP becomes dropped away.

If the pressure drops below five pounds so that the brush 23 is actuated to number four position, the relay LP becomes picked up by the energization of a circuit including brush 23 in number four position, front contact 39 of relay 5P, bus 40, rectifier 41, upper winding of relay LP, and back contact 31 of relay CH. The picking up of this relay establishes a stick circuit that has been described.

If the pressure continues to be reduced so that the brush 23 proceeds in a clockwise direction until it reaches the position number six, a circuit is closed in the number six position to pick up relay GP, this circuit includes brush 23 in the number six position, front contact 34 of relay 5P, bus 35, rectifier 36, upper winding of relay GP and back contact 31 of relay CH. Upon actuation of the brush 23 from the number six to the number five position to complete an indication of reduction of ten pounds in pressure, the bus 45 becomes energized to initiate an indication cycle by the energization of circuits that have been heretofore described.

If the pressure is reduced below the last registered pressure, which may be assumed to be five pounds, and the relay LP is picked up, and then the pressure is restored to the five pound pressure without having been reduced to the extent of ten pounds, the relay LP becomes dropped away by the energization of its lower winding with a polarity to oppose the polarity of energization of its upper winding. The circuit by which the lower winding of relay LP is energized under these conditions includes brush 23 in the number five position, front contact 44 of relay 5P, bus 45, front contact 46 of relay LP, back contact 47 of relay GP, lower winding of relay LP, rectifier 54, and back contact 31 of relay CH. Thus the relay LP becomes dropped away because of the pressure having been restored to the last pressure reading that was transmitted to the control office, without having been reduced enough to initiate another indication cycle.

Having described specifically the mode of operation of the system relative to pressure changes wherein a change in pressure is effective to initiate an indication cycle only when the change is to an extent of ten pounds, assuming that the initial pressure is five pounds, it should be readily apparent that the same mode of operation is effective where the last registered and transmitted pressure is any pressure other than the five pound pressure which has been assumed for purpose of description.

With reference to FIG. 3, a modified form of the present invention is illustrated wherein quickly detachable jumpers are provided in the circuits as a means for determining the amount of difference in pressure that will be required in order to initiate the start of a cycle. These differences in pressure can be selected as shown to be from seven to nine pounds difference. It is assumed according to FIG. 3 that the pressure relays P are all controlled in accordance with the circuits shown in detail for the control of the pressure relay 5P, the circuits which are not illustrated for the control of the relay 5P being assumed to be provided in the same manner as that shown in FIGS. 2A and 2B. The buses 35, 40 and 45 of FIG. 3 will be recognized as corresponding to similar buses in FIGS. 2A and 2B, the bus 35 being provided to control the picking up of relay GP, the bus 40 being provided to control the picking up of the relay LP, and the bus 45 being provided to govern energization of the knock down windings for the relays LP and GP when the brush 23 is restored to the pressure last transmitted to the control office.

According to the circuits of FIG. 3, if it is desired that an indication be transmitted when the pressure becomes nine pounds greater than the last indication transmitted, and if the last indication transmitted was an indication of six pounds pressure, when the brush 23 rotates from the number six position counter-clockwise to the number five position, energy can be applied to the bus 40 for the picking up of relay LP, provided that the jumper 9G is in its lower position. The circuit for the energization of relay LP (see FIG. 2B), extends from wire 55 (see FIG. 3) through jumper 9G, front contact 56 of relay 6P and through bus wire 40 to energize the upper winding of relay LP. The relay GP is already picked up at this time because such relay would be picked up in accordance with the application of energy through the brush 23 in position 7.

In accordance with the relays LP and GP being both in their picked up positions, a circuit is closed for the picking up of relay CH1, corresponding to the relay CH of FIG. 2B, for the initiation of an indication cycle. The circuit by which relay CH1 is picked up includes front contact 57 of relay LP, front contact 58 of relay GP and upper winding of relay CH1. The picking up of relay CH1 causes the dropping away of the normally energized relay 1CH1 to initiate an indication cycle in accordance with the opening of the stick circuit for relay 1CH1 at back contact 59. The relay 1CH1 thus becomes dropped away to initiate an indication cycle. Upon the dropping away of this relay, a stick circuit is closed to maintain the relay CH1 energized until the end of the cycle. This stick circuit includes back contact 60 of relay 1CH1, front contact 61 of relay CH1 and lower winding of relay CH1.

If indications are to be transmitted on an increase of eight pounds pressure, the jumper 8G is positioned in its lower position, and the jumper 9G is positioned in its upper position. This provides a similar mode of operation to that which has been described except that when pressure is increased to an extent of eight pounds from a last reading of seven pounds, the relay LP becomes picked up to initiate the cycle in accordance with energy feeding from wire 55 through jumper 8G in its lower position, front contact 62 of relay 7P and bus wire 40 to the upper winding of relay LP.

Similarly, if it is desired to have the cycles initiated for seven pounds increase in pressure from a last reading of eight pounds, the jumpers 9G and 8G are maintained in their upper positions, and the jumper 7G is operated to its lower position so that energy will be available from wire 55 when the brush 23 is in its number five position for the energization of relay LP through jumper 7G and front contact 63 of relay 8P.

It is believed that it should be readily apparent from the description as it has been set forth, that a similar mode of operation is effective when the pressure is decreased, so as to start an indication cycle when the pressure is reduced selectively to an extent of nine pounds, eight pounds or seven pounds, in accordance with the positions of the jumpers 9L, 8L and 7L. If the cycle is to be started when the pressure is reduced nine pounds, jumper 9L is operated to its lower position so as to connect wire 55 through this jumper and through front contact 64 of relay 4P to bus wire 35 and thus to the relay GP. According to the principles of operation as have been described, when the pressure decreases, the relay LP becomes picked up first, and then the relay GP becomes picked up when the pressure is reduced to an extent requiring transmission of an indication cycle. Thus the relay GP when picked up is effective to initiate a cycle by causing the picking up of relay CH1 in a manner which has been described, which in turn deenergizes the start relay 1CH1 to initiate the transmission of an indication cycle.

To start an indication cycle on a reduction in pressure of eight pounds, the jumper 8L is actuated to its lower position, and the jumper 9L is maintained in its upper position so that energy is applied through front contact 65 when there is a reduction in pressure of eight pounds from an initial pressure of three pounds which has last been transmitted as an indication to the control office. Similarly, the jumper 7L is positioned to its lower position and the jumpers 8L and 9L are positioned to their upper positions for a difference in pressure of seven pounds so that energy is applied through front contact 66 of relay 2P for a reduction in pressure of seven pounds from an initial pressure of two pounds that has been transmitted to the control office.

In the system according to FIG. 3, provision is made the same as in FIGS. 2A and 2B for restoration of a greater pressure relay GP or a lesser pressure relay LP in case the pressure is restored to the initial pressure at the time of transmission of the last indication cycle. It is to be understood that each of the digital input terminals has an input wire such as wire 55 of FIG. 3 that feeds circuits selected on greater and lesser pressure relay contacts respectively comparable to the typical circuits shown in detail in FIG. 3.

It will be readily apparent that, according to the system of FIG. 3, the jumpers can be so positioned that an indication cycle may be initiated for different pressure changes in accordance with whether the pressure is increasing or decreasing. Thus, for example, a start can be rendered effective for an increase in pressure of seven pounds or a decrease in pressure of nine pounds.

Having thus described specific embodiments of the present invention, it is to be understood that these embodiments have been shown and described more to illustrate the principles of operation than to be specific as to the actual structure to be used in practice. It is thus to be understood that various adaptations, alterations and modifications may be applied to the specific forms shown in accordance with the requirements of practice, except as limited by the scope of the appending claims.

What I claim is:

1. A normally inactive code communication system for communicating codes indicative of digital readings over a communication channel from at least one field station to a remotely spaced office comprising:

(*a*) digital input means at the field station variable step by step in accordance with a digital increase or decrease of several digits in a digital reading for selectively energizing control channels for the several digits, one channel at a time, (*b*) storage means rendered effective when said code communication system is active to register a reading corresponding to the control channel that is then energized and to store such registration until said code communicating system is again rendered active, and (*c*) initiating means controlled by said control channels and said storage means for rendering said communicating system active to transmit a reading to the office in response to a change of a predetermined number of several digits from any reading that may be stored by said storage means.

2. A normally inactive code communication system according to claim 1 wherein means is provided for adjusting the predetermined number of said several digits.

3. A normally inactive code communication system according to claim 1 wherein the predetermined number of said several digits may be different in accordance with whether the digital reading is increasing or decreasing.

4. A normally inactive code communication system according to claim 1 wherein the storage means is a relay bank having a relay for each digital control channel.

5. A normally inactive code communication system according to claim 1 wherein the code communication system includes a plurality of field stations, each station having means for automatically initiating an indication cycle in accordance with a change of a predetermined number of digits from a last digital reading that has been transmitted to the office.

6. A normally inactive code communication system for communicating codes indicative of digital readings from at least one field station to a remotely spaced office comprising:

(*a*) digital input means at the field station variable step by step in accordance with a digital increase or decrease of several digits in a digital reading for selectively energizing control channels for the several digits, one channel at a time, (*b*) storage means rendered effective when said code communication system is active to register a reading corresponding to the control channel that is then energized and to store such registration until said code communication means is again rendered active, (*c*) first means governed by the energization of said channels for registering when there is a digital increase in said input means relative to the reading registered by said storage means, (*d*) second means governed by the energization of said channels for registering when there is a digital decrease in said input means relative to the reading registered by said storage means, and (*e*) initiating means responsive to an increase or a decrease in said digital input means of a predetermined number of digits after registration by said first or said second means for initiating a cycle of operation of said communication system for the transmission of an indication of a digital reading to the control office.

7. A normally inactive code communication system according to claim 6 wherein said first and second means each includes a relay and circuit means for energizing the relay in response to a digital increase or decrease respectively in said input means.

8. A normally inactive code communication system according to claim 7 wherein stick circuit means is provided for maintaining each of the relays of said first and second means energized until initiation of the next cycle of operation of the code communication system by that station.

9. A normally inactive code communication system according to claim 8 wherein said second means also provides for the energization of its relay when there is an increase of a predetermined number of several digits relative to the readings stored by said storage means.

10. A normally inactive code communication system according to claim 9 wherein said initiating means is rendered effective only provided that the relays of both said first and said second means are energized.

11. A normally inactive code communication system for the communication of codes indicative of digital readings from at least one field station to at least one control office comprising:

(*a*) digital input means at the field station variable step by step in accordance with a digital increase or decrease of several digits in a digital reading for selectively energizing control channels for the several digits, one channel at a time, (*b*) storage means rendered effective when said code communication system is active to register a reading corresponding to the control channel that is then energized and to store such registration until said code communication means is again rendered active, (*c*) first means governed by the energization of said channel for registering when there is a digital increase in said input means relative to the reading registered by said storage means, (*d*) second means governed by the energization of said channels for registering when there is a digital decrease in said input means relative to the reading registered by said storage means, (*e*) means for cancelling the change registered by said first or said second means provided that the digital input means reading is restored to the reading registered by said storage means without undergoing a digital change sufficient to initiate an indication cycle of the code communication system, and (*f*) initiating means responsive to an increase or a decrease in said digital input means of a predetermined number of digits after registration by said first or said second means for initiating a cycle of operation of said communication system for the transmission of an indication of a digital reading to the control office.

12. A normally inactive code communication system according to claim 11 wherein the code communication system includes a plurality of field stations, each station having means for automatically initiating an indication cycle in accordance with a change of a predetermined number of digits from a last digital reading that has been transmitted to the office.

No references cited.